US012335414B2

(12) United States Patent
Facon et al.

(10) Patent No.: US 12,335,414 B2
(45) Date of Patent: Jun. 17, 2025

(54) CONNECTED SYNTHETIC PHYSICALLY UNCLONABLE FUNCTION

(71) Applicant: SECURE-IC SAS, Cesson-Sevigne (FR)

(72) Inventors: Adrien Facon, Paris (FR); Sylvain Guilley, Paris (FR)

(73) Assignee: SECURE-IC SAS, Cesson Sevigne (FR)

( * ) Notice: Subject to any disclaimer, the term of this patent is extended or adjusted under 35 U.S.C. 154(b) by 842 days.

(21) Appl. No.: 17/258,143

(22) PCT Filed: Jun. 27, 2019

(86) PCT No.: PCT/EP2019/067250
§ 371 (c)(1),
(2) Date: Jan. 5, 2021

(87) PCT Pub. No.: WO2020/011556
PCT Pub. Date: Jan. 16, 2020

(65) Prior Publication Data
US 2021/0234710 A1    Jul. 29, 2021

(30) Foreign Application Priority Data

Jul. 11, 2018 (EP) .................................. 18305929

(51) Int. Cl.
*H04L 9/32* (2006.01)
*H03K 19/003* (2006.01)
(52) U.S. Cl.
CPC ..... *H04L 9/3278* (2013.01); *H03K 19/00307* (2013.01); *H04L 9/3247* (2013.01); *H04L 2209/12* (2013.01)
(58) Field of Classification Search
CPC . H04L 9/3278; H04L 9/3247; H04L 2209/12; H03K 19/00307

(Continued)

(56) References Cited

U.S. PATENT DOCUMENTS 8,694,778 B2    4/2014  Teuwen et al.
10,013,543 B2 *  7/2018  Walsh ................... H04L 9/3226
(Continued)

FOREIGN PATENT DOCUMENTS

EP          3 340 214 A1    6/2018
WO       2007/063475 A2    6/2007
WO       2009/024913 A2    2/2009

OTHER PUBLICATIONS

Adi, et al., "Physical and Mechatronic Security, Technologies and Future Trends for Vehicular Environment Towards Counteracting Cloning in Automotive Industry", May 19, 2018.

(Continued)

*Primary Examiner* — Philip J Chea
*Assistant Examiner* — Ghizlane Maazouz
(74) *Attorney, Agent, or Firm* — BakerHostetler (57) ABSTRACT

There is disclosed a Connected Synthetic Physically Unclonable Function (acronym CSPUF) made of a circuit configured to receive signals of one or more sensors and/or actuators in/of a computer device; determine one or more statistical properties of the noise distribution of the selected one or more of the sensors and/or actuators; receive data IN from one or more external data sources; determine one or more digital signatures (responses) from the statistical properties and the selected external data. In one embodiment, along a response R when challenged by a challenge C, the circuit is configured to receive data IN and/or to communicate data OUT from one or more external data sources. Developments describe uses and advantages of data IN and data OUT channels, e.g. static or dynamic calibration, options to disable the circuit. Other embodiments consider variants of interconnections of two CSPUF circuits, providing "self-cycled", "iterative", "cascaded" and other "blockchain" arrangements.

16 Claims, 5 Drawing Sheets

(58) Field of Classification Search
USPC .......................................................... 380/28
See application file for complete search history.

(56) References Cited

U.S. PATENT DOCUMENTS

| | | | |
|---|---|---|---|
| 10,235,517 B2* | 3/2019 | Lao | G06F 21/73 |
| 10,256,983 B1* | 4/2019 | Bauer | H04L 9/0861 |
| 2008/0141364 A1* | 6/2008 | Skoric | G09C 1/00 |
| | | | 726/20 |
| 2009/0083833 A1 | 3/2009 | Ziola et al. | |
| 2012/0179952 A1* | 7/2012 | Tuyls | H04L 9/0866 |
| | | | 711/E12.078 |
| 2014/0091832 A1 | 4/2014 | Gotze et al. | |
| 2015/0195088 A1 | 7/2015 | Rostami et al. | |
| 2018/0006830 A1* | 1/2018 | Cambou | G06F 21/44 |
| 2018/0351753 A1* | 12/2018 | Gardner | H04L 9/3218 |
| 2019/0026724 A1* | 1/2019 | Wade | H04L 9/3278 |
| 2019/0156066 A1* | 5/2019 | Foster | G06F 21/72 |
| 2020/0045033 A1* | 2/2020 | Flikkema | G06F 9/30145 |
| 2021/0127080 A1* | 4/2021 | Okura | G09C 5/00 |

OTHER PUBLICATIONS

English translation of the Notification of the First Office Action issued in Chinese Application No. 201980046401.1 dated Dec. 28, 2023.

* cited by examiner

CONNECTED SYNTHETIC PHYSICALLY UNCLONABLE FUNCTION

CROSS-REFERENCE TO RELATED APPLICATIONS

This application is a National Stage of International patent application PCT/EP2019/067250, filed on Jun. 27, 2019, which claims priority to foreign European patent application No. EP 18305929.4, filed on Jul. 11, 2018, the disclosures of which are incorporated by reference in their entirety.

TECHNICAL FIELD

The invention generally relates to physical functions, such as Physically Unclonable Functions (designated hereinafter by the acronym PUF) and in particular to a connected synthetic PUF.

BACKGROUND

Over the past decades, computer security has become a major challenge. Attacks have become increasingly sophisticated and efficient. In the same time, computer science applications continuously widen, e.g. with the Internet of Things. In various technical domains, it is known to use physical functions to ensure computer security.

Existing literature in connection to PUF is emergent and both the underlying PUF physics and PUF properties have been investigated (e.g. aging, reliability). Several PUF based implementations have been provided.

For example, patent document U.S. Pat. No. 8,694,778B2 describes a method using a PUF device that receives a communication including a first challenge value, a second challenge value and a remote message authenticity value. The method includes the generation of additional challenge-response pairs in a secure manner. The additional challenge-response pairs are securely communicated between the PUF device and an authenticating server or other device for subsequent use in authentication. However, this approach presents limitations.

There is accordingly a need for advanced methods and systems for building and managing improved Physically Unclonable Functions.

SUMMARY

There is disclosed a Connected Synthetic Physically Unclonable Function (acronym CSPUF) made of a circuit configured to receive signals of one or more sensors and/or actuators in/of a computer device: determine one or more statistical properties of the noise distribution of said selected one or more of said sensors and/or actuators: receive data IN from one or more external data sources: determine one or more digital signatures (responses) from said statistical properties and said selected external data. In one embodiment, along a response R when challenged by a challenge C, the circuit is configured to receive data IN and/or to communicate data OUT from one or more external data sources. Developments describe uses and advantages of data IN and data OUT channels, e.g. static or dynamic calibration, options to disable the circuit. Other embodiments consider variants of interconnections of two CSPUF circuits, providing "self-cycled", "iterative", "cascaded" and other "blockchain" arrangements.

A "Synthetic PUF" (acronym SPUF) according to the disclosure can accordingly opportunistically leverage existing or otherwise available sensors and/or actuators in a consumer electronics device. A connected SPUF (CSPUF), adding connectivity to an SPUF, allows numerous advantages applicable to various use cases.

Responses of CSPUFs can be stabilized, e.g. by being less dependent to noisy environment. PUF's unclonability may be reinforced. Aging of PUFs may be managed more efficiently. Connected SPUFs may enable new networking schemes, devices or networks (e.g. arrangement in series and/or in parallel, distributed networks, self-cycled CSPUF, cascading networks, etc). Connectivity of CSPUFs may imply more controllability of PUF devices.

BRIEF DESCRIPTION OF DRAWINGS

The accompanying drawings, which are incorporated in and constitute a part of this specification, illustrate various embodiments of the invention and, together with the general description of the disclosure given above, and the detailed description of the embodiments given below, serve to explain the embodiments of the invention but in any case does limit its scope.

DETAILED DESCRIPTION

As used herein, "computer device" designates a consumer electronics appliance having communication resources enabling access to computing resources (e.g. a smartphone, a television, a microwave-oven, a fridge, a robot, a drone, a connected bike, a car, a plane, etc.).

As used herein, a "Physically Unclonable Function" (or "PUF") designates a physical function. A PUF is inherently tangible. A PUF is a hardware function providing a response when a challenge is applied to the considered piece of hardware. Although associated properties of a PUF (e.g. "reliability" or "unclonability" properties) are subtle and still debated in the art, the term PUF appears to be a naming convention. In the present disclosure, the described method steps do characterize a PUF. Embodiments of the invention enable to create a "Physically Unclonable Function", otherwise named as a Synthetic PUF: commonly accepted properties of a PUF are matched by the emerging properties of the method steps once performed.

A Challenge-Response Pair (acronym CRP) designates one (single) pair. A PUF corresponds to all possible CRP, given a considered hardware. Knowing all pairs could allow a perfect simulation of a (unique, by construction) PUF, or more modestly to know sufficiently to handle replay attacks.

Hardware is therefore essential to a PUF because it is at the source of entropy and therefore of unclonability. In other words, a PUF cannot be "pure" software. Software can help leveraging the underlying hardware entropy, in a reliable manner. Such software will be hereinafter named as F or F_HW.

As used herein, a "Synthetic Physically Unclonable Function" acronym "SPUF" designates a synthetic or composite assembly of sensors and/or actuators (hereinafter referred to as "sensors" for the sake of simplification) selected for the statistical properties of the distribution of their noise. Such an embodiment generally can be constructed in one given physical device but distributed embodiments remain possible. The patent document EP3340214 filed by the applicant describes an example of a SPUF.

Other examples of a SPUF comprise a CMOS SPUF.

A first example of a CMOS SPUF can be obtained by performing the following method and/or its variants. Such method comprises the following steps:
defining a subset of sensor components of a sensor:
challenging the subset of sensor components under uniform conditions:
receiving output signal values from the subset of sensor components and for each component of the subset of sensor components, determining the statistical moment of order i of the temporal distribution of the output signal value of each sensor component:
determining one or more outliers sensor components, the outlier sensor components being components whose $i^{th}$ order statistical moment has a difference with the mean value of the spatial distribution of the chosen moment over the subset superior in absolute value to a threshold, the $i^{th}$ order statistical moment of one sensor component being estimated on the temporal distribution associated to this sensor component.

In some embodiments, the sensor may be an imaging sensor and a sensor component may be an active pixel, the imaging sensor thereby comprising a plurality of active pixels.

In one embodiment, the step of challenging the subset of active pixels under uniform conditions comprises the step of acquiring a plurality N of images.

The sensor may be a combination of independent sensors.

In some embodiments, the method may further comprise the step of generating an identifier from the determined outlier's sensor components.

In one embodiment, the method may further comprise the step of comparing the generated identifier and/or hash value thereof with other identifiers to authenticate the imaging sensor. In a development, the threshold is received or predefined.

The threshold may be a function of one or more desired properties of the generated identifier, the properties comprising bit length and/or bit error.

The number of images N and the threshold may be set so as to determine repeatedly the same outliers pixels for a given statistical order i.

In one embodiment, information about outliers' sensor components may be stored in a helper data file. Uniform conditions may be spatially uniform conditions which are obtained by closing the shutter associated with the imaging sensor and/or by grounding out the photodiodes associated the pixels of the subset of pixels and/or by adjusting the light source and/or by shaping the light beam. The subset of pixels may be determined according to structural information on the shared electronics of the imaging sensor.

A first example of a CMOS SPUF can be obtained by a system configured to handle a sensor, the system comprising:
a processor configured to define or to receive information about a subset of sensor components of the sensor, the subset of sensor components being challengeable under uniform conditions;
a receiver configured to receive output signal values from the subset of sensor components.

For each component of the subset of sensor components, the processor may be configured to determine the statistical moment of order i of the temporal distribution of the output signal value of the each sensor component. The processor may be further configured to determine one or more one or more outlier sensor components, the outliers sensor components being components whose $i^{th}$ order statistical moment has a difference with the mean value of the spatial distribution of the chosen moment over the subset superior in absolute value to a threshold, the $i^{th}$ order statistical moment of one sensor component being estimated on the temporal distribution associated to this sensor component.

In one embodiment, the processor may be further configured to generate an identifier from the determined outliers' pixels.

A second example of a CMOS SPUF can be obtained by performing another method which comprises the following steps:
defining a subset of sensor components of the sensor:
challenging the subset of sensor components under uniform conditions:
receiving output signal values from the subset of sensor components:
for each component of the subset of sensor components, determining the statistical moment of order i of the temporal distribution of the output signal value of the each sensor component:
determining one or more pathological sensor components, the pathological components being components whose sum of the distances of values to all the other components of the subset is greater than a threshold, the distance between two sensor components being determined by the difference of the $i^{th}$ statistical moment values of the two temporal distributions associated to the components obtained when challenging the subset of sensor components under uniform conditions.

In one embodiment, the sensor may be an imaging sensor and the sensor component may an active pixel, the imaging sensor thereby comprising a plurality of active pixels. In one embodiment, the step of challenging the subset of active pixels under uniform conditions may comprise the step of acquiring a plurality N of images. The sensor may be a combination of independent sensors. The method may further comprise the step of generating an identifier from the determined pathological sensor components. The method may further comprise the step of comparing the generated identifier and/or hash value thereof with at least another identifier to authenticate the sensor. In one embodiment, the threshold may be received or predefined. The threshold may be a function of one or more desired properties of the generated identifier, the properties comprising bit length and/or bit error. The number output signal values received from the subset of sensor components and/or the threshold may be set so as to determine repeatedly the same pathological sensor components for a given statistical order i. In one embodiment, at least some partial information about coordinates of pathological sensor components may be stored in a helper data file. The sensor may be an imaging sensor and uniform conditions may be spatially uniform conditions obtained by closing the shutter associated with the imaging sensor. The sensor may be an imaging sensor while the uniform conditions are spatially uniform conditions obtained by grounding out the photodiodes associated the pixels of the subset of pixels. In one embodiment, the sensor may be an imaging sensor while the uniform conditions are spatially uniform conditions obtained on the subset of pixels by adjusting the light source and/or by shaping the light beam. In one embodiment, the image may be in a lossy compression format. In an embodiment, the image may be a video frame.

The second example of a CMOS SPUF can be obtained by a system comprising:
  a processor configured to define or to receive information about a subset of sensor components of the sensor, the subset of sensor components being challengeable under uniform conditions:
  a receiver configured to receive output signal values from the subset of sensor components: for each component of the subset of sensor components.

Such processor may be configured to determine the statistical moment of order i of the temporal distribution of the output signal value of each sensor component, the processor being further configured to determine one or more pathological sensor components, the pathological components being components whose sum of the distances of values to all the other components of the subset is greater than a threshold. The distance between two sensor components may be determined by the difference of the $i^{th}$ statistical moment values of the two temporal distributions associated with the components obtained when the subset of sensor components is challenged under uniform conditions. In an embodiment, the processor is further configured to generate an identifier or a key from the determined pathological pixels.

As used herein, the term "Connected SPUF", hereinafter designated by the acronym CSPUF, is a SPUF provided with a Communication channel (IN and/or OUT), with data intervening at different physical and/or logical levels within the SPUF. A non-communicating or silent CSPUF is a SPUF.

As used herein, the term "Distributed Connected Synthetic Physically Unclonable Function", designated hereinafter by the acronym DCSPUF, is a CSPUF which leverages parts of different physical devices (which are in different locations, for example, distributed in an apartment or in servers in the Cloud). A DCSPUF requires communication. C can be considered implicit in a DCSPUF, thus also referred to as a DSPUF.

A DCSPUF is a species of a CSPUF (it is a specific CSPUF). A CSPUF is a species of a SPUF, which in turn is a species of a PUF.

According to embodiments of the invention, there is provided a circuit configured to:
  receive signals of one or more sensors and/or actuators of a computer device:
  determine one or more statistical properties of the noise distribution of the selected one or more of the sensors and/or actuators;
  receive data IN from one or more external data sources:
  determine one or more digital signatures from the statistical properties and the selected external data.

Such circuit can be named a "Connected Synthetic Physically Unclonable Function" or CSPUF.

In one embodiment, the circuit may be configured to receive data IN and/or communicate data OUT from one or more external data sources.

In one embodiment, a selection amongst the one or more sensors may be performed and/or a selection amongst external data may be performed.

In one embodiment, the received data IN may statically calibrate one or more sensors. Data IN may provide additional information on statistical moments of sensors and this information may be used for calibration purposes. For example, the gravity factor given altitude can be taken into account for GNSS positioning. This data for example can be provided via an API.

In another embodiment, the received data IN may dynamically calibrate one or more sensors. Beyond one isolated calibration purposes, external data IN may be provided over time and thus can continuously modify the inner working of the signature generation of the SPUF (which then can remain stable). For example, external data can relate to the external environment in which the SPUF device is placed, and in which the PUF response is produced. Information about the environment can enable or allow or at least attempt to counteract, neutralize or otherwise cancel out environment fluctuations. Advantageously, the environment instabilities can be measured and further neutralized to stabilize the PUF response.

In one embodiment, the received data IN may comprise information leading directly or indirectly to the disabling of the circuit. Various consequences can be implied by the reception of one or more signals or values (e.g. hash, passphrase, strings of words, etc): subparts—if not all parts—of the circuit can be modified (e.g. disabled, deactivated, decayed, deprecated, destroyed, ignored, etc). Modifications can be logical and/or physical. For example, a "kill switch" command can be send to disable a target subpart of the circuit, if not the entire SPUF arrangement. As CSPUFs can be chained or otherwise arranged, addressability of particular SPUFs or parts thereof can be advantageous.

Modifications can have various degrees or forms. In intermediate forms, adaptive and/or reactive networked CSPUFs can be formed. For example, instead of a kill switch command, deprecated modes such as backup modes can be activated. Such embodiments can be advantageous in Internet of Things environments wherein perimeters of devices and systems can vary. For example, a magnetic sensor can monitor a magnetic field: if in excess of a predefined threshold, for example 4 Tesla, the circuit can be disabled or an alert may be raised.

In one embodiment, the received data IN, or parts thereof, may serve as or contribute to a challenge of the circuit, the circuit providing a response in response to the challenge. External data can "enrich" or "complement" or "supplement" a challenge. The combinatorial space of all possible challenges is too large for brute force exploration: external data IN can comprise a secret or a key or a token to allow the response to be produced.

In one embodiment, the received data IN, or parts thereof, may sign a challenge of the circuit, the circuit providing a response in response to the challenge. A subset of challenges can be known or predefined (e.g. succession of challenges generated pseudo-randomly by a LFSR).

In one embodiment, the circuit may be further configured to communicate data OUT, the data being related to the internal information of the circuit. For example, data OUT can be used to provide a third party (man and/or machine) with internal information, such as status data or aging information. For example, if sensors and/or actuators are drifting too fast, data sent out can lead, directly and indirectly, to ignore the responses produced by the circuit 100 (which can be broken, degraded or otherwise dysfunctional).

For example, in a CMOS SPUF, some pixels' areas may be not addressable or out of order. Responses to challenges may then be ignored. Advantageously, many downstream policies become possible: trust thresholds, ignoring responses or ranges of responses, sending a kill switch command in response to an excessively aged combination of sensors and/or actuators, recombining another selection of sensors and/or actuators, receive data with weighing or ponderation, etc.

In one embodiment, the circuit may be further configured to communicate data OUT, the data being used as contextual or environmental information of the circuit. The environment, as sensed by the sensors composing the SPUF, can be measured in several of its physical properties. For example, measures can be performed for temperature, ambient electromagnetic field, etc. Given these measures, analysis of the distributions of values ($i^{th}$ moment, e.g. kurtosis) can be performed and sweat spots can be identified: noise can be leveraged.

In one embodiment, the circuit may be further configured to communicate data OUT to one or more third parties, a third party being a computer or a PUF or a SPUF. As used herein, a 'third party' may designate: a) a non-PUF entity for example a data server in the Cloud or a local machine monitoring the aging of the SPUF (e.g. in a smartphone, for authentication in payment processes): or b) a PUF (classical one): or c) a SPUF.

Such latter chaining opens many opportunities (collection of IoT devices, servers in the Cloud). In such an embodiment, one can envision to build ever-changing aggregation of SPUFs interconnected via the cloud (for example, a statistical property Alpha of the noise of a sensor A in a smartphone number 1 can be combined a statistical property Beta of a sensor F in a smartphone 2).

In one embodiment, a submitted challenge C may modify or control or otherwise influence communicated data OUT. For example, data OUT can be the result of a test performed on C.

In one embodiment, communicated data OUT may modify a submitted challenge C. Before, during or after R is produced, data OUT may modify C (complement, filter, addition, etc). For example, in the CMOS example, all active pixels can be set to white as a challenge (via data IN).

In one embodiment, data IN may modify the response R, while or after the response R is produced. For example, in a CMOS CSPUF, a third party or an operator can validate or invalidate the response being produced R, depending on its/his needs. The key R can be manipulated (e.g. splitting, complementary, etc), whatever is OUT.

In one embodiment, a response R may retroact on data IN. This embodiment enables an "iterative" CSPUF ("autochaining").

In some embodiments, the response R may modify the challenge C. This embodiment enables a "self-cycled" SPUF, along an independent communication channel IN-OUT. The response R1 of a challenge C1 can be used as a challenge C2, and so on. In one embodiment, as soon as the response R starts to be produced, the challenge C can be modified on-the-fly. Depending on the considered embodiments, part(s) or the entirety of the response can be used to modify the challenge (as modifying on-the-fly an incoming challenge).

There is further provided a system, the system comprising two or more of circuits as previously described, wherein communicated data OUT of a first circuit is taken as an input data IN by a second circuit. Such an embodiment can be used to propagate or diffuse a particular value.

In one embodiment, such a system may comprise two or more of circuits as previously described, the response R of a first circuit being taken as an input data IN by a second circuit. This chaining may work as a blockchain.

In one embodiment, such a system may comprise two or more of circuits as previously described, communicated data OUT of a first circuit being taken as a challenge C by a second circuit. This arrangement can be named a "cascade" and may be used to manage fallbacks, for example if aging increases or reliability decreases.

In one embodiment, such a system may comprise two or more of circuits as previously described, the response R of a first circuit being taken as a challenge C by a second circuit. This embodiment corresponds to a serial arrangement (or chain of signatures).

There is further provided a (computer-implemented) method comprising the steps of:
  receiving in a circuit signals of one or more sensors and/or actuators of a computer device: —determining one or more statistical properties of the noise distribution of the selected one or more of the sensors and/or actuators:
  receiving data IN from one or more external data sources:
  determining one or more digital signatures from the statistical properties and the selected external data.

There is provided a computer program product comprising instructions for carrying out the steps of the described method when the computer program is executed on a computer device.

Figure 1:
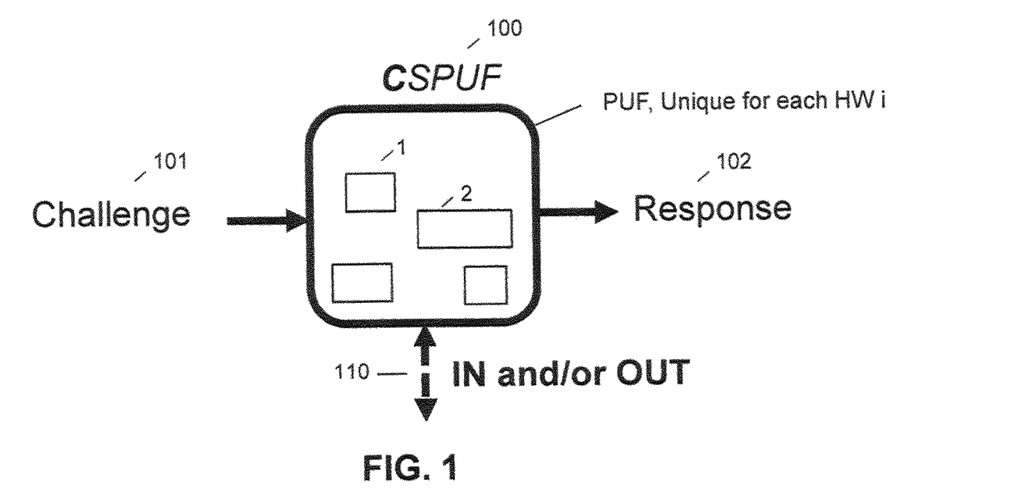
FIG. 1 shows a Connected Synthetic Physically Unclonable (CSPUF) device according to the invention.

FIG. 1 shows a Connected Synthetic Physically Unclonable (CSPUF) device according to some embodiments of the invention.

In some embodiments, a SPUF 100 designates a material combination of selected sensors (sensors and/or actuators, represented by 1 or 2, etc . . . ), along with logical operations operated or operable on signals of the selected sensors (sensors and/or actuators), more precisely on the handling of the properties of the noise distribution of the sensors (sensors and/or actuators).

A connected SPUF—or CSPUF 100—adds a communication channel 110, the channel being unidirectional or bidirectional depending on embodiments.

A diversity of retroactions can be described for a given CSPUF (i.e. involving C, R, F, data IN and data OUT). Coupling of a plurality of CSPUFs in turn enables many different advantageous embodiments (infra).

While a challenge C, a response R and the Physical Unclonable Function of the CSPUF 100 can remain the same (CRP pair or CRP in short), it is advantageous to provide data IN and/or OUT (110), independently of the CRP.

Figure 2:
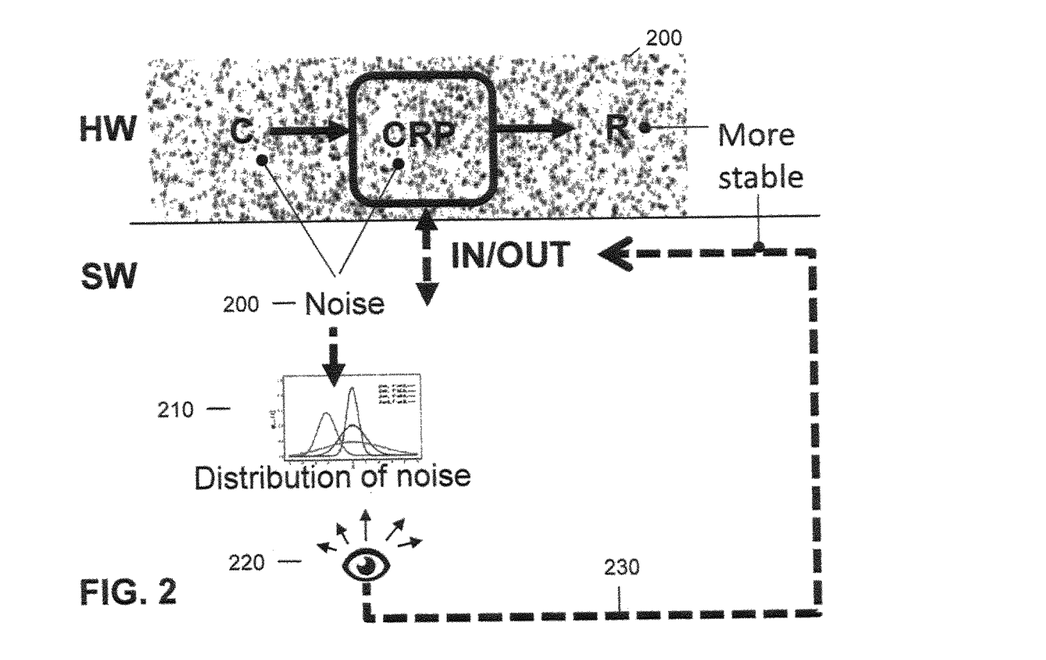
FIG. 2 illustrates noise influences.

FIG. 2 illustrates the noise influences.

In practice, in the industrial reality, the PUFs or SPUFs or CSPUFs according to the present disclosure are subject to noise 200. Hardware (e.g. sensors, actuators, challenge and other parts of the electronics) and/or software (e.g. signals, bugs, computations, etc . . . ) are indeed drawn in noise 200 (perturbations, interferences, imperfections, limitations, down to quantum noise).

The term "noise" encompasses environmental fluctuations (e.g. the car embedding the SPUF has stopped; electromagnetic field is above a certain threshold, etc.).

In the SPUF framework (composed of sensors), for a given stable, controlled challenge C, response R can depend on noise or environmental conditions, thereby distorting the challenge (introducing some variability) and thus reducing the reliability of the PUF implementation. For example, the noise 200 can affect the Challenge C and/or the(S) PUF (via impacts on sensors composing the Synthetic PUF).

The inventors have accordingly analyzed (210) the distributions of the noise 200 at sensors' levels, in particular at high statistical moments 220. Such analysis can be performed locally and/or remotely (cloud). For a local embodiment, computations can be performed by a dedicated hardware circuit for example, and/or general-purpose circuits can be used (e.g. the CPU or GU of a smartphone whose sensors are solicited for example), the latter being direct ("pure hardware") or indirect (e.g. software program soliciting the underlying computing resources). Insights of the analysis can be used downstream to adjust or otherwise modify 230 data IN and/or data OUT.

Figure 3:
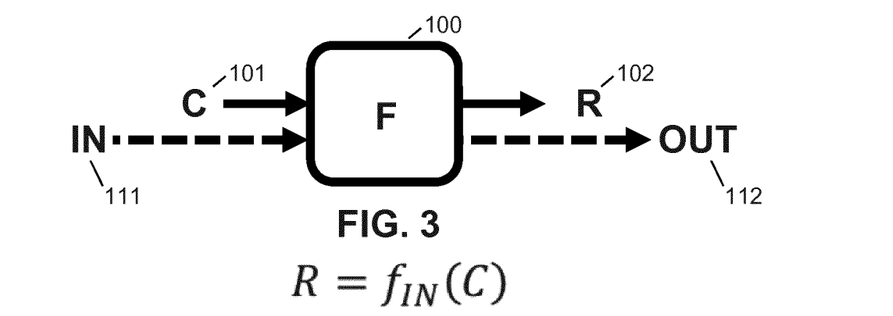
FIG. 3 shows a representation of a CSPUF, with a bidirectional communication channel.

FIG. 3 shows a representation of a CSPUF, with a bidirectional communication channel.

A challenge C 101 is provided as an input to a SPUF/CSPUF implementing a CRP 100 which in turn provides an output or response R 102. Data IN 111 can be received. Data OUT 112 can be sent out. The relationships between C 101, R 102, IN 111 and OUT 112 are complex and are described hereinafter.

Advantageously, the handling of Data IN and/or data OUT can improve the handling of the SPUF (e.g. better R stability, handling of aging, etc . . . ).

FIG. 3 shows an embodiment of a CSPUF with two communication directions: IN and OUT. Some CSPUFs may be provided with this dual capacity, while other may not (some may be provided with IN, others only with OUT).

Challenge

C represents the challenge (for a SPUF, the format can be "an image": in other examples it can be a value, a set of values, a signal, a shock, etc . . . ).

In the described framework, C is given (by a human and/or machine third party, a client, an end user, etc . . . ).

C is independent from the sensor(s) of the SPUF/CSPUF 100.

There is generally no way to impede C from challenging the CSPUF 100.

Response

R is by construction the unique response of the HW of the SPUF to a given challenge C. Regarding the format, in the SPUF case, it is a key or ID or signature or strings of bits.

Responses R can be classified or machine-learned. Machine Learning indeed can help to maximize entropy extraction from a given HW device.

There is generally no way to impede the response R to be produced once the hardware is challenged.

Challenge-Response Pair, CRP

F designates the CRP, challenge-response pair(s). It corresponds to the Physical Unclonable function. Each hardware (HW) piece has its own $FH_{m}$. This function cannot be cloned. It cannot be predicted, thereby impeding attacks (by replay). Attacks of a PUF (or SPUF, or CSPUF) can consist in exploring the space of possible (scanning) and replay attacks.

F in a SPUF can be a software embodiment (reprogrammable), manipulating statistical properties (statistical moments) of the distribution. Alternatively, or complementarily, it can be embodied into hardware, e.g. as a circuit, sometimes reprogrammable as well.

The software (SW) of the SPUF, on top of the CSPUF HW, analyzes the distribution of statistical properties of noise coming from the sensors. This SW can be "part" of the CSPUF or can involve additional resources.

The function F in SW specifies which part of the HW sensors are involved (e.g. part of the CMOS, which combination of sensors) and which noise statistical moment/property is to be leveraged or monitored.

A—Considering One CSPUF for Itself (No Downstream or Upstream Retroactions)

The relationships between C, R, data IN and data OUT is described in a first framework, when a CSPUF is considered in isolation, for itself, i.e. not in chained configuration with other devices.

Data IN

The form and/or substance of data IN can vary. Data IN can be a parameter or value, without intrinsic meaning for the SPUF. It can be "external" or "absolute", stemming from the outside (for whatever reason). It can be random. It can be determined by an operator that data IN equals 1. It can be a function of another value. It can be a secret. It can be static (blind and constant correction). It can be dynamic (parametric).

Data IN cannot "modify" C by itself, because C is "given" by construction.

Data IN can statically and/or dynamically influence or correct C (be added or be adjunct to C) to make it meaningful in different environmental conditions (offset, undistortion). This correction indeed depends on the environmental conditions and makes the resulting Challenge truly independent of them.

Data IN can modify the function F in a SPUF: it can impact the internals determining the synthetic CRP challenge-response pair.

Data IN can modify the selection or perimeter of sensors constituting the SPUF. Data IN also can modify the statistical analysis being performed, therefore Data IN can "switch" models implemented in a SPUF (for example, it can be "switched" from F1 of the first CMOS SPUF example to F2 of the second CMOS example).

Data IN cannot lead to multiply responses. To the contrary, data IN can lead to improve stability of R (aging) by manipulating the appropriate properties (in noise distribution).

Data OUT

Data OUT cannot "modify" C (a priori, unless there is retroaction loop wherein data OUT influences the way C is given).

Data OUT cannot modify F of a PUF or SPUF. In other words, Data OUT coming downstream does not impact the internals of the CSPUF.

Data OUT can "leak" or provides information about the SPUF and/or its context. It can be "contextual" or "internal to the SPUF", or "related to the SPUF", or "relative" i.e. relative to the environment of the SPUF. For example, electromagnetic conditions or an ISO value can be provided by data OUT. Data OUT can comprise metadata: i.e. data about data (providing contextual information, for example about environmental conditions).

The uses of Data OUT are numerous and advantageous. Data OUT enables downstream regulation (trust in results, to validate, authorize, infirm, confirm, attenuate, mitigate, attenuate, weigh, and modulate responses). For example, data OUT can inform about the ISO parameter is CMOS SPUF, or electromagnetic ambient conditions. Such data can be used for further control(s) (e.g. if the measure electromagnetic field is superior to 4 Tesla, then it can be deduced that the CSPUF is not reliable or shall be recalibrated). Downstream uses of the data OUT can be local (e.g. in a smartphone) and/or remote (e.g. a decision logic in the Cloud).

Data IN and data OUT are independent: there is no direct or indirect link between data IN and data OUT.

There is no link a priori between R and data OUT (physically and/or logically, in space and/or in time).

B—Considering a CSPUF Chained or Otherwise Regulated with Other Retroactions

In a second framework, the CSPUF is part of a system and can be part of regulations comprising retroaction, feedforward and other mechanisms.

In some instances, indeed, Data IN, Data OUT, C and R can be tied (with downstream retroactions).

Data IN and data OUT can be rendered dependent or correlated in some situations, for example wherein data IN indirectly modifies OUT, or wherein data OUT is reinjected as part of data IN. In some cases, data IN can be equal to data OUT.

Data OUT can "modify" C if there is retroaction loop wherein data OUT influences the way C is given (not shown). For example, data OUT indicating "ISO=100" can lead to change the challenge C.

Data OUT coming downstream may impact F or the internals of the CSPUF if the data OUT is reinjected into the CSPUF.

Figure 4:
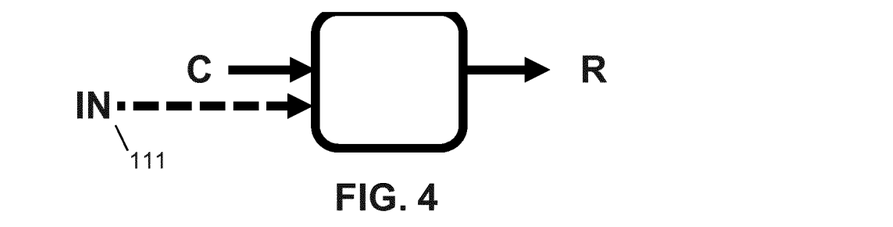
FIG. 4 illustrates some embodiments of the invention wherein data IN is received.

FIG. 4 illustrates some embodiments of the invention wherein data IN is received.

The figure illustrates a first type of CSPUF (a "controllable" one), which features only a data entry (data IN 111).

In the example as shown in FIG. 4, Data IN can modify the function F. For instance, in a CMOS SPUF, the number of acquired images may be changed, or the areas of pixels used to determine a signature, thereby having an impact on quality.

In the example, C is independent from IN (parallel configuration).

In one embodiment, data IN can be a kill switch signal. In one embodiment, data IN can inhibit F, thus R.

In one embodiment, data IN can correspond to—or comprise—a secret channel.

In one embodiment, data IN can be used for calibration purposes (static or dynamic correction), see infra.

Figure 5:
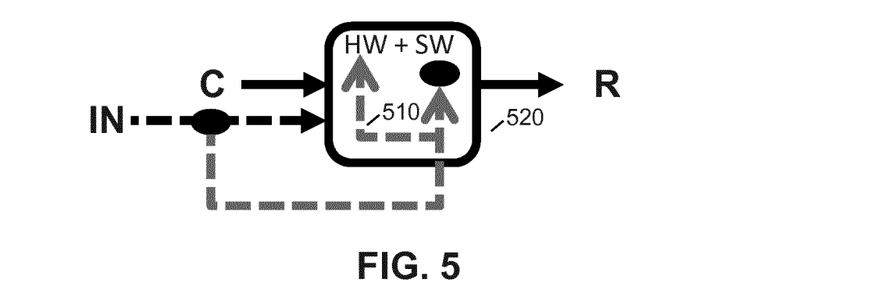
FIG. 5 illustrates some embodiments of the invention wherein data is received and further modifies the SPUF itself.

FIG. 5 illustrates some embodiments of the invention wherein data is received and further modifies the SPUF itself.

This FIG. 5 illustrates an important feature of the CSPUF according to the invention: in some embodiments, it may be programmable. It can be programmed once, or a few limited times, or at will (re-programmable).

In one embodiment, the HW 510 and/or SW 520 in the CSPUF can be modified (entirely or in part). In other words, the Physically Unclonable Function or function F or CRP can be modified by modifications brought to HW and/or SW.

A CSPUF is made of hardware 510 (HW) but the analysis performed on data is ruled in software 520 (SW). SW comprise executable instructions which when executed on a computer perform logical operations (such as statistical analysis). The SW leverages or uses the underlying HW of the CSPUF (and possibly other circuits, not shown). SW and HW in some aspects are a duality: SW can be encoded into HW, and HW can encode SW. There are ways to change HW and/or SW (HW only, SW only, or both HW and SW).

In some embodiments, data IN can lead to "wrap up" or "burn" or otherwise have a tangible impact on the HW circuitry of the CSPUF.

In one embodiment, for whatever parameter as data IN (e.g. "weather is nice" or data IN equals 1), it can lead to change F.

In some embodiments, data OUT also can influence back the SW ruling of the CSPUF. For example, if CSPUF is too aged, too degraded or otherwise dysfunctional, then the internal HW can be changed (or the way to use the available HW i.e. SW can be changed). For example, in a CMOS CSPUF, if there are too many—or too few-pathological pixels, then the CSPUF can be manipulated differently.

In other words, F or CRP or the implemented PUF methodology itself can be changed: for example, if and when predefined criteria are met (e.g. aging, environmental conditions, user choices, etc . . . ), a method according to the invention may comprise the step of switching the selection of sensors (perimeter) and/or the way the distribution of sensors noise is analyzed or used. For example, it can be "switched" from F1 of the first CMOS SPUF example to F2 of the second CMOS example. In other words, given a same underlying hardware, praised for its entropy and its unclonable imperfections, the logical part leveraging that piece of hardware can be modified or changed.

Figure 6:
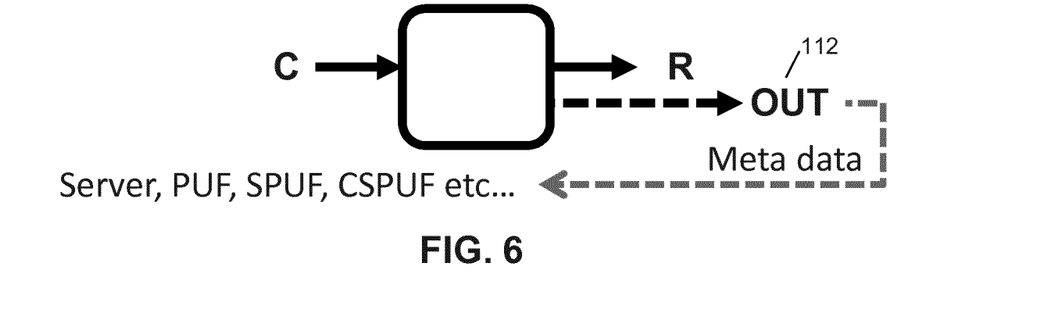
FIG. 6 illustrates some embodiments of the invention wherein data is sent out.

FIG. 6 illustrates some embodiments of the invention wherein data is sent out.

The figure illustrates another type of CSPUF ("a chatting CSPUF").

In such an embodiment, the CSPUF may sent out (or produce or evades or creates or defines or determines) data OUT.

The data OUT may be directed towards various parties (e.g. comprising a third party which may be or comprise a (standard) PUF, a SPUF according to embodiments of the invention, and a connected SPUF or CSPUF. Data OUT also can be sent to a server in the Cloud, for further data processing. For example, a CSPUF implemented in a car can transmit data to a smartphone.

Figure 7:
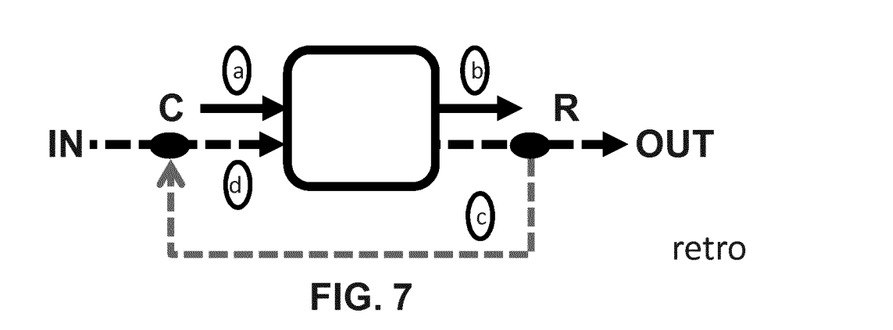
FIGS. 7, 8 and 9 show various embodiments of the invention, according to different retroactions.
Figure 8:
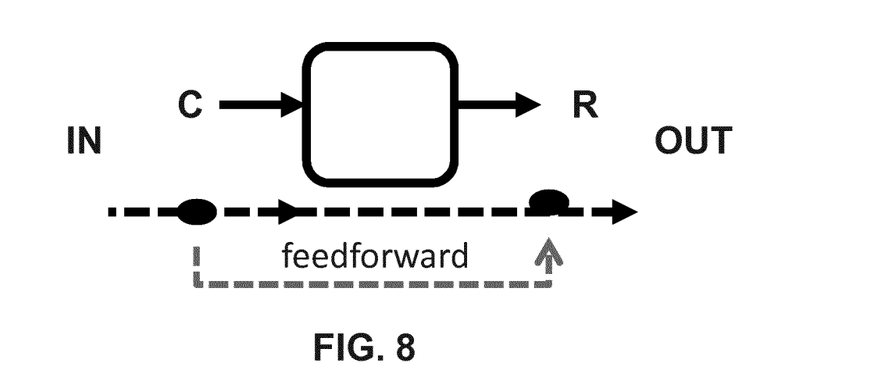
Figure 9:
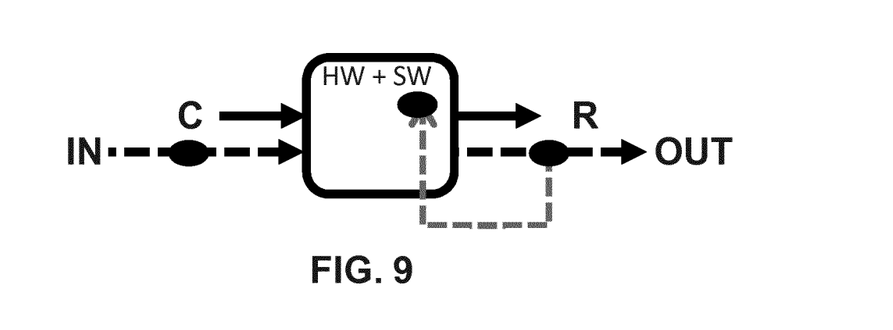

FIGS. 7, 8 and 9 show various embodiments of the invention, according the different retroactions.

A diversity of retroactions can be justified and advantageous depending on use cases. A few examples are described hereinafter.

FIG. 7 illustrates an embodiment of the invention wherein a challenge C challenges (a) the CSPU, which in turn produces (b) a response R. Before, during or after the response R is produced, data OUT or part of data OUT is sent (c) to data IN and reinjected (d) in the CSPUF.

Such an embodiment can be advantageous. For example, in a CMOS CSPUF, data IN can designate a subset of pixels. If a drift in the response R is detected (e.g. dead pixels, or mean values drifting in excess, etc . . . ), the retroaction loop can be reactive or adaptive. For example, some more or different information can be injected in data IN so as to modify F to handle future incoming challenges. In the CMOS CSPUF example, different subsets of CMOS pixels can be used. In this case, R is a function depending on IN adjusting F challenged by C.

In one embodiment, data OUT can be the counter of the number of responses R having being generated. If too many responses have been produced, then it is likely that the device is being "scanned" or attacked. The counter can be implemented in HW and/or in SW (SW observing the HW responding to challenges).

FIG. 8 illustrates an embodiment wherein the communication channel is impacted while the CSPUF is not. For example, data IN can stem from a third party (e.g. a server, another PUF, a SPUF, another CSPUF, etc . . . ). In one embodiment, data IN can equal data OUT (message transmission through a chain or sequence of connected CSPUFs). In such a case, CSPUF devices, in addition to their respective physically Unclonable Functions, can bear or support data transmission (which at some point can be used in retroactions). In one embodiment, data IN can modify data OUT. "To modify" can mean one or more actions among the following: replace, suppress, add, change, substitute, change, transform, vary, alter, compress, minimize, convert, append, offset, moderate, inhibit, activate, deactivate, encode, encrypt, cipher, decipher, obfuscate, harden, decode, transcoded, adjust, update, limit, compensate, etc. In particular, feedforward mechanisms can be enabled.

FIG. 9 illustrates one embodiment wherein data OUT retroacts on the SW part of the CSPUF. Such embodiment can for example be advantageous if the CSPUF shows aging signs: in such a case, a parametric model used in the CSPUF can be changed, to switch to more robust or reliable CRP pairs.

FIGS. 10 to 15 show various embodiments of the invention, according the different retroactions.

Figure 10:
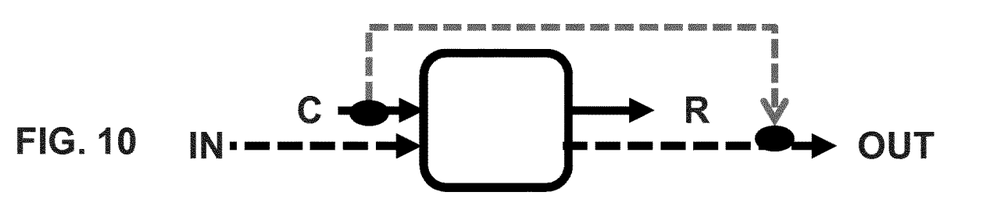
FIGS. 10 to 14 show various embodiments of the invention, according to different retroactions.

FIG. 10 illustrates an embodiment wherein the submitted challenge C modifies or controls or influences data OUT. For example, data OUT can be the result of a test performed on C. If the test is successful (given predefined criteria), then R can be tagged as acceptable. If the test is not verified (for example if C belongs to a domain or interval which is out of range of nominal or otherwise acceptable domains or intervals for challenges), then the response can be rejected or otherwise ignored. For example, if the Challenge is not acceptable, it may mean the CSPUF is attacked or otherwise explored/scanned, and in such a case a falsified (or random) response may be provided.

Figure 11:
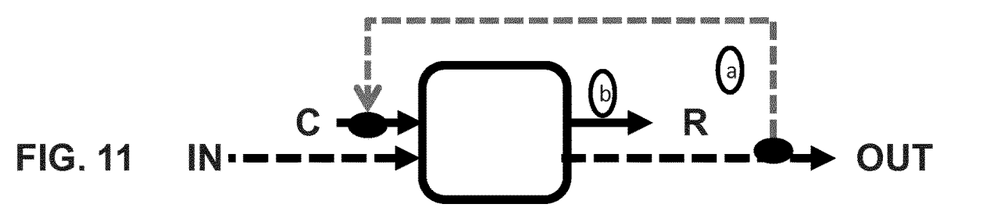

FIG. 11 illustrates an embodiment, wherein data OUT can have an impact—or no impact—on R via an impact on C. C via F produces R. Before, during or after R is produced (b), data OUT may modify C (complement, filter, addition, etc . . . ). For example, in CMOS CSPUF, all pixels can be set to "white" via data IN.

Figure 12:
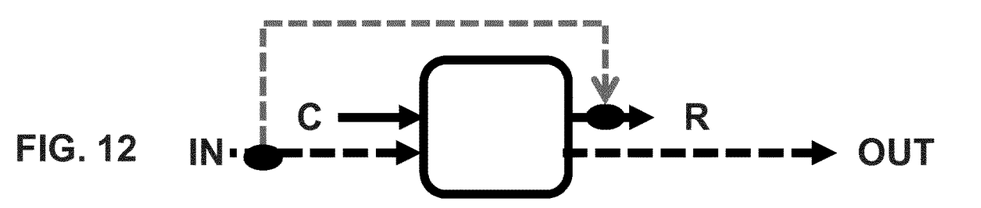

FIG. 12 illustrates an embodiment, wherein data IN is applied to R (upon, as soon as, during, while or after R is produced). For example, in CMOS CSPUF, a third party or an operator can validate or invalidate the response being produced R, depending on its/his needs. The key R can be manipulated (e.g. splitting, complementary, etc . . . ), whatever is OUT.

Figure 13:
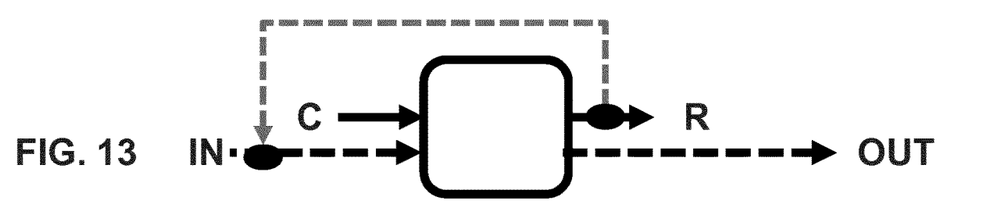

FIG. 13 illustrates an embodiment, wherein response R retroacts on data IN (upon, as soon as, during, while or after R is produced). Such an embodiment is advantageous in that it enables an "iterative" CSPUF ("auto-chaining"). In such embodiments, R retroacts on data IN which modifies F, which in turn produces R when challenged with C. Sequences of responses Rs can be analyzed, modified and reinjected in F. In the CMOS CSPUF example, such embodiments allow for a convergence towards a subset of pixels, for example from the entire matrix to a stable subset, etc.

Figure 14:
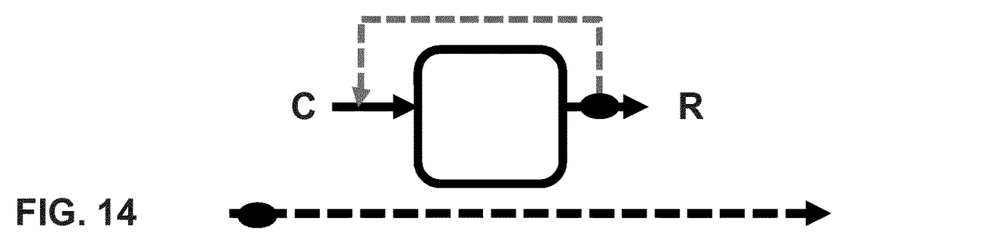

FIG. 14 illustrates an embodiment, wherein the CPUF may be "self-cycled", with independent channels IN and OUT. Independent channel IN and OUT in such a case constitute a data communication channel. (e.g. wires, etc . . . ). In this description we shall designate by IN and OUT signal that can be related to the CSPUF.

FIGS. 16 to 19 illustrates examples of combinations of two CSPUFs.

Figure 16:
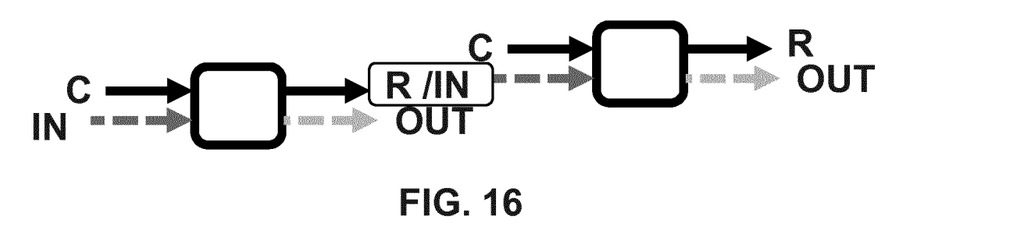
Figure 17:
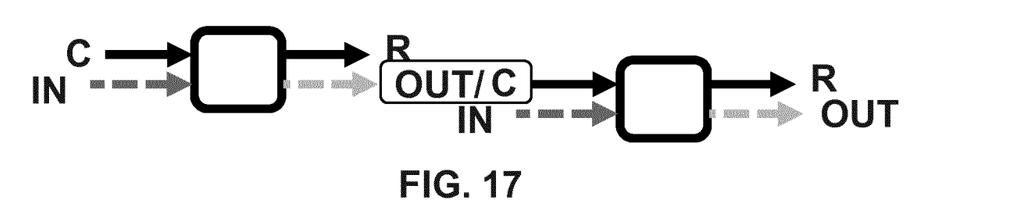
Figure 18:
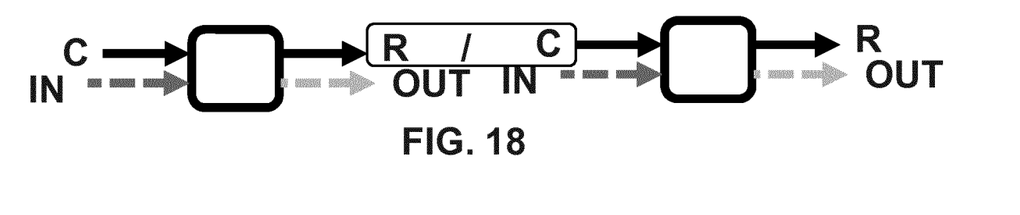

Such a "pair" of two CSPUFs can constitute an elementary brick (an "endpoint") used to build larger networks. As can be seen, sequences or chains in series with higher numbers of CSPUFs can be deduced from the presented elementary brick. Arrangements in parallel are not shown. A fortiori, arrangements combining arrangements in series and/or in parallel are not shown. Yet graphs and network topologies can be determined, corresponding to the different configurations. PUFs are valuable today because of their simplicity, low-cost and low energy consumption. In yet some embodiments of the invention, even if larger networks can lead to higher complexity increasing the surface of attacks, millions of CPUFs can be coupled or interconnected, providing resilient and smart networks.

Regarding the coupling of two CSPUFs, communications can be local and/or remote (short distance up to long distance). For example, a first CSPUF can be in Paris while the second one can be in New York. The two CSPUFs can be embedded in a same smartphone or car. In time, interactions can occur fast or can be performed at various time intervals.

Figure 15:
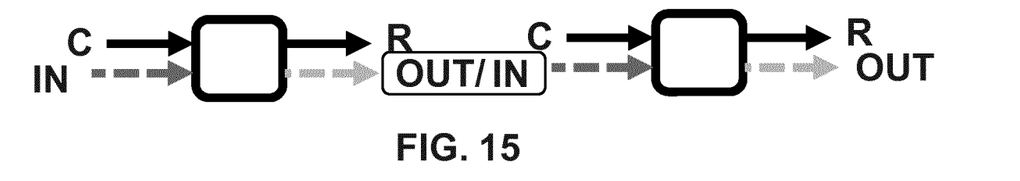
FIGS. 15 to 18 illustrates exemplary combinations of two CSPUFs.

FIG. 15 illustrates one embodiment or possible coupling of two CSPUFs according to the invention. In such an embodiment, data can be transmitted in a network of chained CSPUFs. Data IN and data OUT of the respective device get connected, for example enabling a "master" or "edge" CSPUF 1 can rule other CSPUFs. Such an arrangement indeed can be used propagate or diffuse a particular value (for example data IN equals "4 Tesla"), or commands or orders or other instructions. In such a case, each CSPUF can perform its physically Unclonable Function, independently from each other, yet there can be a communication canal. In a particular sub case, data IN may equal data OUT (for example the expression "ISO=100" can be propagated in the network. Non-linear effects also can happen, since data IN can modify F in a CSPUF. For example, if data IN equals "4 Tesla" in a first CSPUF1, then data OUT of the first CSPUF1 can set data IN in the second CSPUF to equal "5 Tesla", or "6 Tesla" in a third one, etc. In some embodiments, data OUT of CSPUF1 can be entirely different from data IN 2 of CDSPUF 2. In some embodiments, data OUT of CSPUFn can be a zêta function of CSPUF1.

FIG. 16 illustrates one embodiment configured in a "blockchain". In such an arrangement, Ri (response of the $i^{th}$ device) serves to modify Fj via data INj (data IN of the next device). This chaining indeed works as a blockchain: a first device outputs a first signature, which serves as a challenge C for a second device, outputting a second signature, which in turn is used to determine a third signature, etc. With independent devices A, B and C, a chain ABC will be different from a chain ordered CAB. Such a feature can be advantageous if compositionality is critical. Attacking one device may prove to largely insufficient: as with Bitcoin, the hash of hashes has to be attacked.

In such embodiments, Ri for example can serve to control the chain downstream. In some embodiments, [Ri . . . Rj] can be XORed or manipulated (split, permuted, etc . . . ). Use cases can be advantageous: for example, if a response or signature Ri is intercepted, demonstrated or proven wrong, then data INj can react by changing the S-PUF function (as previously described, it can be "switched" from F1 of the first CMOS SPUF example to F2 of the second CMOS example).

Such embodiment combines the features and properties of Physically Unclonable Functions (physical functions) with features and properties of blockchains (trustless computing, distributed consensus, etc . . . ).

FIG. 17 illustrates one embodiment wherein data OUT of a first CSPUF 1 is taken as a challenge C of the CSPUF 2. In other words, the first CSPUF or node maintains its working untouched, wherein C1 is given. The response is then "cascaded" trough the neighbors of the first CSPUF. Such embodiments can be advantageous. For example, in the CMOS CSPUF example, a broken or out-of-order pixel as data OUT at an $i^{th}$ iteration can lead to change or refocus Cj of a next node. If aging or reliability decreases, then the further CR pair may be changed via C (yet CSPUFj is independent from i). Such embodiment can be used for to enable fallbacks circuits. Ri and Rj are independent and can be combined or otherwise pondered.

FIG. 18 illustrates one embodiment wherein the response R of a first CSPUF1 is taken as a challenge C for the next CSPUF2. Whereas FIG. 14 shows a self-cycled CSPUF, this embodiment represents a serial combination of CSPUFs. Such embodiments depict chains of signatures, thereby implying the uniqueness of a plurality of chained signatures. If a weak (or compromised or defective or aged or otherwise altered) node is present, the whole chain is compromised. There can be no substitution of a piece of the chain because each piece is by definition unclonable.

In some embodiments, data OUT of CSPUF1 can optionally be connected to data IN of CSPUF2. The communication channel is optional. In some embodiments, data INi and data OUTj can have their own rules or behaviors.

In one embodiment, the selection of sensors may maximize reliability and/or entropy.

Depending on embodiments, a sensor may be selected in the group comprising a pressure sensor, ultrasonic sensor, humidity sensor, gas sensor, motion sensor, acceleration sensor or accelerometer, displacement sensor, force measurement sensor, gyro sensor or gyroscope, temperature sensor, image sensor, video sensor, U.V. sensor, magnetic sensor, CMOS image sensor, a silicon microphone, Inertial Measurement Unit (IMU), pressure sensor, micro-mirror, radiofrequency sensor, magnetic field sensor, digital compass, oscillator, luxmeter or light sensor, proximity sensor, G.N.S.S. (e.g. G.P.S.), barometer sensor, Wi-Fi sensor, Bluetooth sensor, NFC sensor, pedometer, pulse oximetry sensor, heart rate sensor, and fingerprint sensor.

Some embodiments of the invention can be entirely hardware embodiments. In other words, CSPUF parts according to the invention may be entirely hardware (e.g. embedded sensors and circuits). Some embodiments can contain both hardware and software elements. In other words, a CSPUF may combine hardware and software. The invention also can take the form of a computer program product accessible from a computer-usable or computer-readable medium providing program code for use by or in connection with a computer or any instruction execution system. A computer-usable or computer-readable can be any apparatus that can contain, store, communicate, propagate, or transport the program for use by or in connection with the instruction execution system, apparatus, or device. The medium can be an electronic, magnetic, optical, electromagnetic, semiconductor system (or apparatus or device) or a propagation medium.

In space, some method steps can be performed locally and/or remotely (e.g. in the smartphone itself, possibly with some steps being performed in the network or in the cloud). Local execution can involve (specific/dedicated and/or generic) hardware blocks, and/or software. Corresponding hardware circuits can be distributed within one or more computer devices, or gathered in a specific circuit. In time, some steps can be performed in the past (e.g. prior steps, "offline", etc . . . ) and/or in the present time (e.g. "online"). Hardware may be intangible (i.e. does not evolve over time, at least not with intention), or can be reprogrammed.

The invention claimed is:

1. A PUF circuit comprising one or more imaging sensors, the PUF circuit comprising a processor configured to receive information about a subset of sensor pixels of an image sensor, the PUF circuit being configured to apply one or more challenges to the subset of sensor pixels under spatially uniform conditions, the PUF circuit comprising a receiver configured to receive output signal values from the subset of sensor pixels, in response to a challenge applied to said subset of sensor pixels, wherein the PUF circuit comprises a bidirectional data communication channel, and the PUF circuit is configured to:
determine one or more statistical moments of a noise distribution of said output signal values;
further receive input data IN through said data communication channel from one or more external data sources using the data communication channel, said data IN relating to an external environment in which the PUF circuit is used;
determine a PUF response R from said one or more statistical moments and said selected input data IN received from said one or more external data sources, said response being a digital signature, wherein the input Data IN are used to handle of the PUF circuit,
wherein the PUF circuit is further configured to communicate data OUT to one or more external entities using said data communication channel, the data OUT being related to internal information of the circuit; and
wherein said communicated data OUT is configured to modify an applied challenge C.

2. The circuit of claim 1, wherein the received data IN comprises information leading directly or indirectly to disabling of the PUF circuit.

3. The circuit of claim 1, wherein the received data IN, or parts thereof, serves as or contributes to a challenge of the PUF circuit, said circuit providing a response in response to said one or more challenges.

4. The circuit of claim 1, wherein the received data IN, or parts thereof, signs a challenge of the PUF circuit.

5. The circuit of claim 1, wherein said at least one external entities comprise at least one computer or another PUF circuit.

6. The circuit of claim 1, wherein the applied challenge C is configured to modify and/or control and/or influence communicated data OUT.

7. The circuit of claim 1, wherein said data IN is configured to modify the response R, while or after the response R is produced.

8. The circuit of claim 1, wherein the response R is configured to retroact on data IN.

9. The circuit of claim 1, wherein the response R is configured to modify the challenge C.

10. A system comprising two or more PUF circuits according to claim 1, the PUFs circuits comprising a first PUF circuit and a second PUF circuit, wherein the communicated data OUT of the first PUF circuit is taken as an input data IN by the second PUF circuit.

11. A system comprising two or more PUF circuits according to claim 1, the PUFs circuits comprising a first PUF circuit and a second PUF circuit, wherein the response R of the first circuit is taken as an input data IN by the second circuit.

12. A system comprising two or more PUF circuits according to claim 1, the PUFs circuits comprising a first PUF circuit and a second PUF circuit, wherein communicated data OUT of the first circuit is taken as a challenge C by the second circuit.

13. A system comprising two or more PUF circuits according to claim 1, the PUFs circuits comprising a first PUF circuit and a second PUF circuit, wherein the response R of the first circuit is taken as a challenge C by the second circuit.

14. A method for generating a digital signature, the method being implemented by a PUF circuit comprising one or more imaging sensors, the method comprising receiving information about a subset of sensor pixels of an imaging sensor, applying one or more challenges to the subset of sensor pixels under spatially uniform conditions, and receiving output signal values from the subset of sensor pixels, in response to a challenge applied to said subset of sensor pixels, wherein the PUF circuit comprises a bidirectional data communication channel, and wherein the method comprises:
determining one or more statistical properties of a noise distribution of said output signal values;
receiving input data IN from one or more external data sources, through said data communication channel, said data IN relating to an external environment in which the PUF circuit is used;
determining a PUF response R from said one or more statistical properties and selected input data IN received from said one or more external data sources, said response being a digital signature,
wherein the input Data IN are used to handle of the PUF circuit,
wherein the method comprises communicating data OUT to one or more external entities using said data communication channel, the data OUT being related to internal information of the circuit; and wherein said communicated data OUT is configured to modify an applied challenge C.

15. The circuit of claim 1, wherein the processor is configured to determine the statistical moment of order i of a temporal distribution of the output signal value of the each sensor pixel, the processor being further configured to determine one or more outlier sensor pixels, the outliers sensor pixels being pixels whose $i^{th}$ order statistical moment has a difference with the mean value of the spatial distribution of the chosen moment over the subset superior in absolute value to a threshold, the $i^{th}$ order statistical moment of one sensor pixel being estimated on the temporal distribution associated to this sensor pixel, the processor being further configured to generate an identifier from the determined outliers' pixels.

16. The circuit of claim 1, wherein the processor is configured to:
for each pixel of the subset of sensor pixels, determine the statistical moment of order i of a temporal distribution of the output signal value of each sensor pixel; and
determine one or more pathological sensor pixels, the pathological pixels being pixels whose sum of distances of values to all the other pixels of the subset is greater than a threshold, the distance between two sensor pixels being determined by the difference of the $i^{th}$ statistical moment values of the two temporal distributions associated to the pixels obtained when challenging the subset of sensor pixels under uniform conditions,
the processor being further configured to generate an identifier from the determined pathological sensor pixels.

* * * * *